US006844682B1

(12) United States Patent
Stevens

(10) Patent No.: US 6,844,682 B1
(45) Date of Patent: Jan. 18, 2005

(54) FLUORESCENT BALLAST WITH EMERGENCY LIGHTING CAPABILITY

(76) Inventor: Carlile R. Stevens, P.O. Box 8290, Horseshoe Bay, TX (US) 78657

( * ) Notice: Subject to any disclaimer, the term of this patent is extended or adjusted under 35 U.S.C. 154(b) by 0 days.

(21) Appl. No.: 10/642,942

(22) Filed: Aug. 18, 2003

Related U.S. Application Data

(63) Continuation-in-part of application No. 10/104,076, filed on Mar. 21, 2002, now Pat. No. 6,628,093.
(60) Provisional application No. 60/281,841, filed on Apr. 6, 2001.

(51) Int. Cl.[7] ............................................. H05B 41/14
(52) U.S. Cl. ........................ 315/86; 315/224; 315/307; 315/308
(58) Field of Search .............................. 315/86, 200 R, 315/209 R, 224–226, 244, 246, 291, 307–308, DIG. 2, DIG. 5, DIG. 7

(56) References Cited

U.S. PATENT DOCUMENTS

| | | | | | |
|---|---|---|---|---|---|
| 4,277,728 | A | * | 7/1981 | Stevens | ....................... 315/307 |
| 5,371,439 | A | * | 12/1994 | Griffin | ..................... 315/209 R |
| 5,600,211 | A | * | 2/1997 | Luger | .......................... 315/307 |
| 5,677,602 | A | * | 10/1997 | Paul et al. | ................... 315/224 |
| 6,072,283 | A | * | 6/2000 | Hedrei et al. | ............... 315/307 |
| 6,259,215 | B1 | * | 7/2001 | Roman | ........................ 315/307 |
| 6,329,761 | B1 | * | 12/2001 | Melis et al. | ............ 315/209 R |
| 6,696,803 | B2 | * | 2/2004 | Tao et al. | .................... 315/291 |

* cited by examiner

Primary Examiner—Thuy Vinh Tran
(74) Attorney, Agent, or Firm—Roger A. Marrs

(57) ABSTRACT

A gas discharge lighting system with emergency lighting capability includes a gas discharge lighting device, a source of alternating current input power, and an electronic ballasting circuit having a direct current requirement and coupled between the gas discharge lighting device and the source of input power. The electronic ballasting circuit includes an alternating current-to-direct current conversion device, a power regulator connected to the conversion device, a controllable output direct current-to-alternating current inverter operated with a substantially square wave output, an impedance network, a controlling device for controlling the operation of the inverter and delivering power to the gas discharge lighting device, and an external source of direct current input power coupled to an input of the power regulator through an unidirectional current flow device.

6 Claims, 3 Drawing Sheets

FLUORESCENT BALLAST WITH EMERGENCY LIGHTING CAPABILITY

This application is a continuation-in-part of U.S. application Ser. No. 10/104,076 filed Mar. 21, 2002, which is now U.S. Pat. No. 6,628,093; which claims the benefit of provisional application Ser. No. 60/281,841 filed on Apr. 6, 2001 and now abandoned.

BACKGROUND OF THE INVENTION

1. Field of the Invention

The present invention relates to the field of power inverters used for electronic lighting ballasts and the use of stand-by battery power in order that the same ballast may be used to provide emergency lighting at a lower level to conserve battery life in the event of power failure.

2. Brief Description of the Prior Art

There are many varied public domain circuits involving the generation of high frequency inputs for driving fluorescent lamps, compact fluorescent lamps, high intensity discharge and other forms of gas discharged lighting. There are ballasts that operate on direct current that are driven from a battery to supply emergency lighting. Where emergency lighting is needed the standard fixture will contain a regular line current driven ballast as well as a direct current ballast and a battery. In some cases a single battery may be used to supply direct current to several fixtures with emergency lighting capability. Unless, with added expense, transfer relays are employed a separate lamp must be installed in the fixture. Emergency lighting provides the minimum light required to evacuate a building. This is necessary to allow the battery to last as long as possible and not be overly large and expensive. A charging method for the battery must also be provided. In spite of the direct current ballast being smaller because of the lower power required there is still considerable additional expense involved is providing emergency lighting.

SUMMARY OF THE INVENTION

Accordingly, the above problems and difficulties are obviated by the present invention which incorporates a ballast with circuitry to allow the level of the lighting device to be adjusted, a separate direct current input and a sensing means within the ballast to lower the light level and thus the amount of power required from the direct current input when the normal line power fails. A method of recharging the battery by supply current to flow out of the direct current input when the ballast is operating from line power is also provided.

OBJECTS OF THE INVENTION

Therefore, it is among the primary objects of this invention to supply a simple and easy method to provide emergency utilizing only a single ballast for a gas discharge lighting device.

It is another object of this invention to reduce the amount of energy used to provide the emergency lighting over that required for normal lighting and thus increase battery life.

Yet another object of the invention is to provide a ballast that will operate from either alternating or direct current power.

Yet still another object of the invention is to provide a method of direct connection to a battery including maintaining a charge on the battery while in normal lighting mode.

A further object of the invention is make this ballast part of an overall lighting system.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

OPERATIONAL DESCRIPTION OF THE PREFERRED EMBODIMENT

Figure 2:
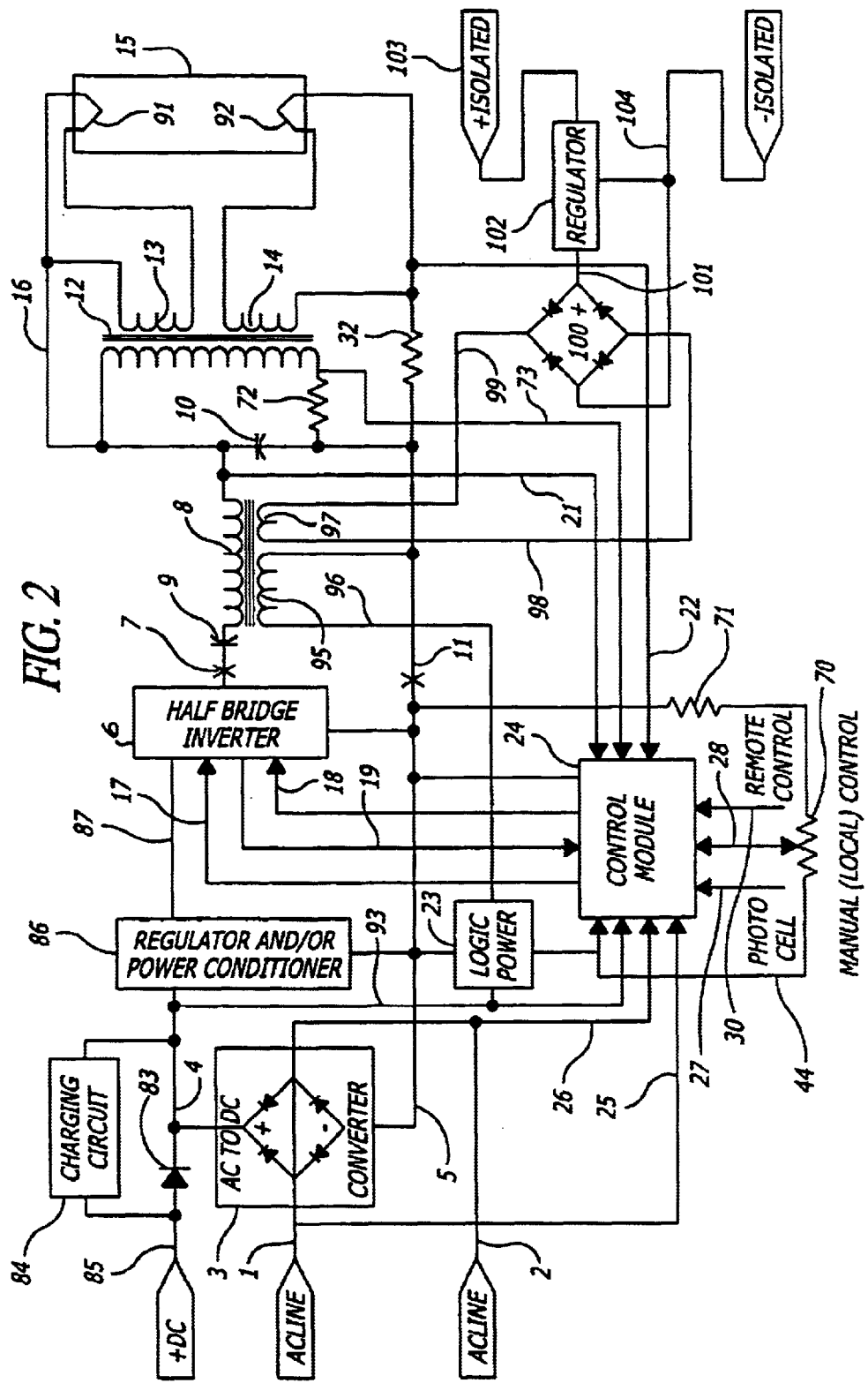
FIG. 2 is a block diagram of a preferred embodiment of the subject invention driving a gas discharge lighting device.

Referring now to FIG. 2, electrical power enters from the AC power line on lines 1 and 2 to the AC to DC converter module 3 and leaves on lines 4 and 5 as plus and minus DC power. Line 5 is considered the common of the ballast circuit. The AC to DC conversion module 3 can be any form of public domain conversion system. In this instance 4 diode bridge is depicted. The DC voltage and current is further conditioned and regulated to correct the power factor and harmonic distortion with respect to the power line by regulator and/or power conditioner 86 which could be any form of public domain regulator such as the method depicted in my U.S. Pat. No. 4,277,728, now expired. And/or is used as in some applications only power conditioning is needed and in other cases only regulation in needed. A single circuit does either or both but the one that does both is more expensive to manufacture.

Figure 1:
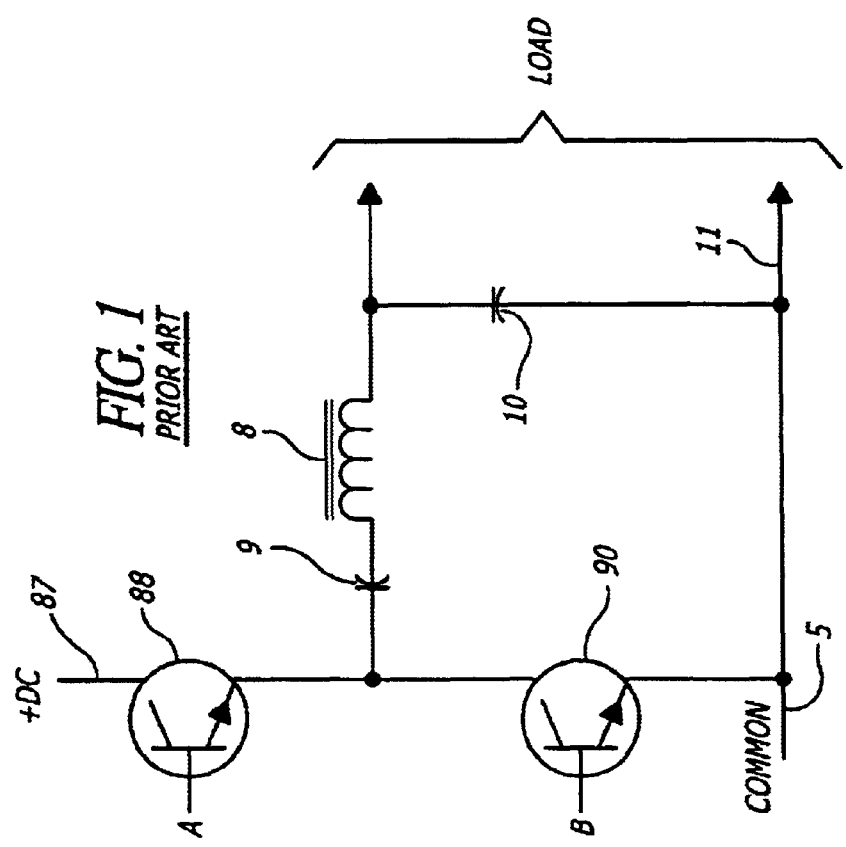
FIG. 1 shows a prior art half bridge configuration of an inverter with switching alternately applied again between points A and B. Because switching device A is not connected to the common bus, only certain types of switches may be used practically in this application. For example, a vacuum tube would be very difficult but not impossible to apply here. When switching transistor 88 is on current flows from the plus DC supply through DC blocking capacitor 9 to the series resonant circuit consisting of inductor 9 and capacitor 10. The load is connected across capacitor 10.

Block 6 is the half bridge converter as shown in FIG. 1. Line 17 connects point A of FIG. 1 to the control and drive module 24. Line 18 connects point B of FIG. 1 to the control and drive module. The output of the half bridge 6 is on line 7 and connects, via DC blocking capacitor 9, to inductor 8. It also connects to control and drive module 24 via line 19. DC blocking capacitor 9 is large enough that its value does not enter into the resonant calculation but acts simply to pass the AC with little or no impedance while totally blocking any DC component from flowing into the load. Inductor 8 and capacitor 10 make up a series resonant circuit that converts the square wave output of the half bridge to a sine wave. This is applied to the output load in this case a gas discharge lighting device 15 by line 16 and through current sensing resistor 32 to line 11. Transformer 12 connected between line 16 and through current sensing resistor 72 to line 11, across the load, provides power for the lamp's heaters 91 and 92 from secondary windings 13 and 14 respectively.

Figure 4:
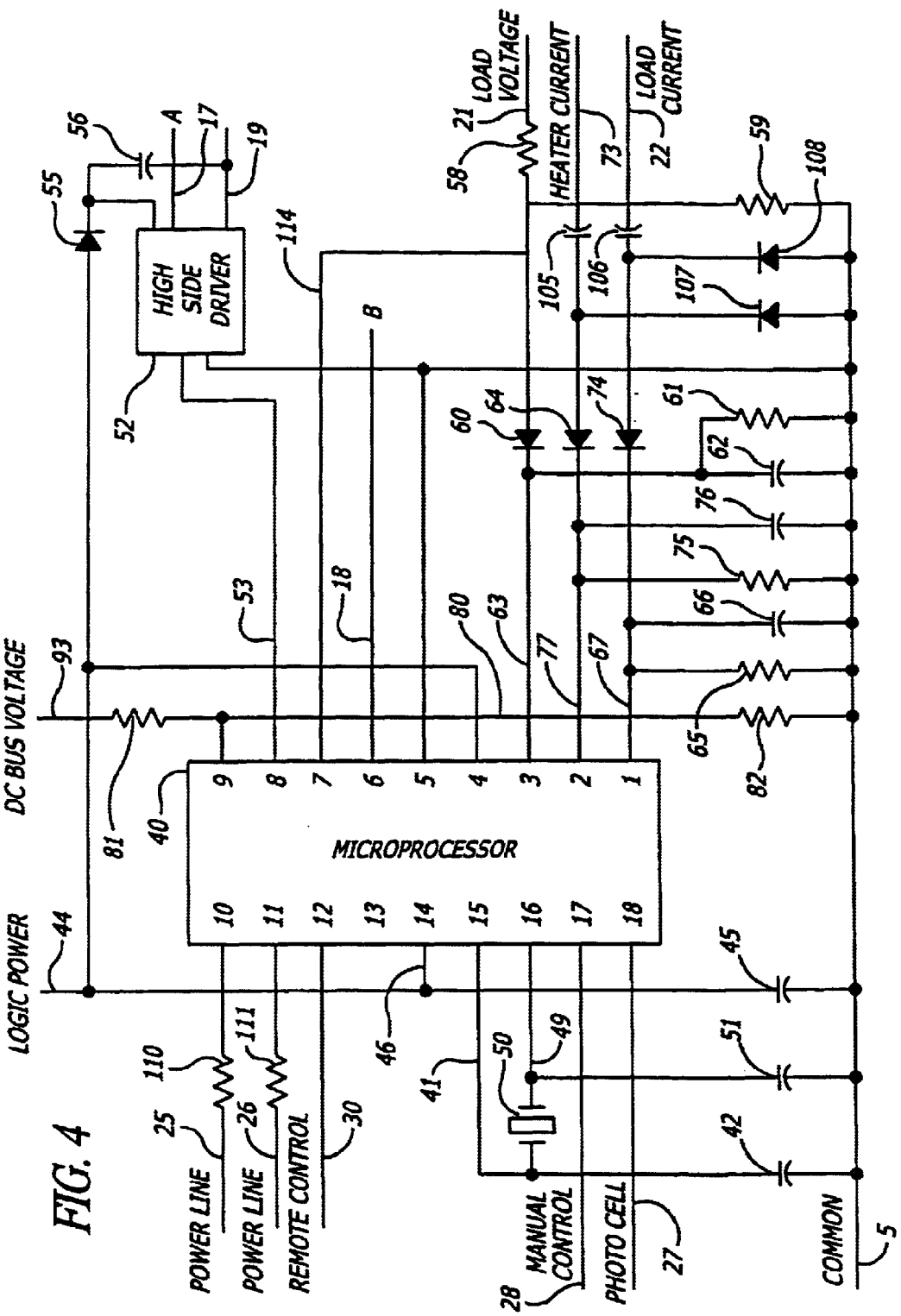
FIG. 4 is a schematic representation illustrating a microprocessor chip as part of the control module of FIG. 2.

Control module 24, which will be further discussed under the description of FIG. 4, receives the current feedback from current sense resistor 32, which also may be any other form of current sensing device, via line 22. Output voltage across the load is fed back on line 21. This line also serves to feed back the phase of the sign wave that is presented across the load and may be used by the control module to maintain a resonant frequency if required. Heater current is fed back via line 73 as a voltage drop across resistor 72 which is in series with the primary of heater transformer 12. When power line carrier signal is used to send control information to the control and drive module, the, signal is presented to the module through lines 25 and 26. The signal on lines 25 and 26 also allows the control module to determine if AC line power is being applied to the ballast for activation of the emergency lighting features of the ballast. The Photocell input 27 which is either all of the amount of light delivered by the load, or a series of operational input control pulses or the amount of light on the surface illuminated by the lighting device is fed through line 27 or both. Manual control is supplied through line 28 and remote control when used comes in on line 30.

Logic power to the control module is provided from the logic power module 23 which is supplied from either the DC bus 4 via line 93 for start up or winding 95 on inductor 8 via line 96. A supply of isolated power for the operation of various control devices by tapping power from inductor 8 via secondary 97 connected by lines 98 and 99 to bridge rectifier 100. The output of bridge rectifier 100 is fed via line 101 to regulator 102 while line 104, connected to the (−) side of the bridge rectified becomes the common for this isolated supply which is output at 103.

Direct current enters at the input 85 and flows through diode 83 to the DC bus 4. Typically this DC voltage will be much less than the peak AC line voltage so regulator 86 will be of the boost type to present a constant voltage on line 87. Under DC operation this will not be a problem for the regulator circuit as the control module, sensing the absence of the AC line input, will reduce the power output considerably and thus the power drawn by the half bridge inverter 6. During this time the charging circuit is disabled as the voltage at its input and output is essentially the same. When the AC line voltage is present the DC bus voltage is used as the source for the charging circuit 84 that returns current to the direct current input 85.

Figure 3:
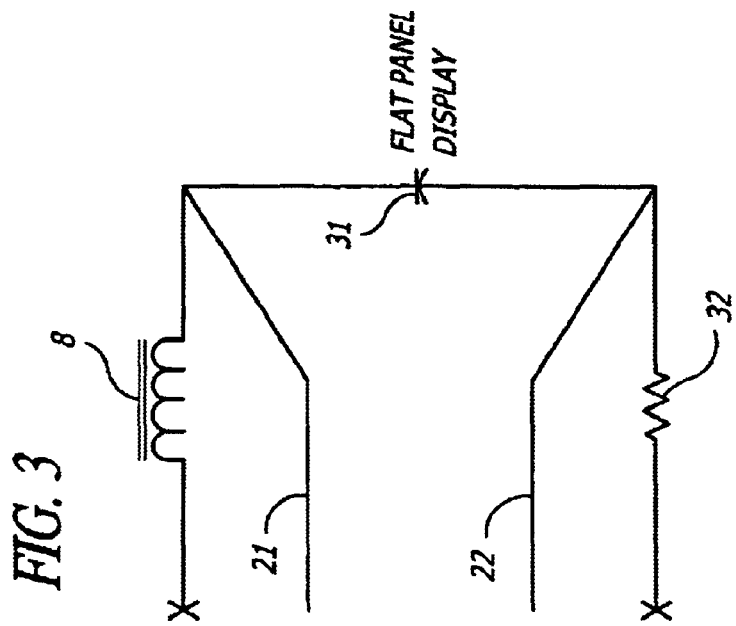
FIG. 3 depicts a change in the preferred embodiment of FIG. 2 to drive a flat panel lighting device.

Referring to FIG. 3 the connection for the electroluminescent or flat panel lighting device 31 is shown. The two points X and X are connected in FIG. 3 where the X and X's are to replace the circuitry to the right of the X's in FIG. 2. Inductor 8 is connected in the same manner, but capacitor 10 of FIG. 2 s replaced by the electro-luminescent panel itself 31. The panel is, in fact, a large capacitor, therefore, it serves not only as the load, but as the resonant capacitive element. The DC blocking capacitor of FIG. 9 is not needed since the load itself is a capacitor. The amplitude and phase angle of the voltage across the panel is fed back to the control module the same as before via line 21. The current in the panel is measured by the voltage drop across resistor 32 is the same manner as in FIG. 2 via line.

Referring now to FIG. 4 logic power for the microprocessor is fed in on line. 44 from the logic power module. It is further filtered by capacitor 45 and supplied to the microprocessor at the Vdd input 14 on line 46. The operating frequency of the processor chip is set by the selection of crystal or resonator 50 which is loaded by capacitors 42 and 51 connected to the processor at the oscillator inputs 15 and 16 by lines 41 and 49. The frequency is varied according to the application. For example, when driving a flat panel display, the frequency is between 800 and 1,000 hertz and the crystal would most likely be a resonator. When driving a high-intensity discharge lamp, the frequency may be as high as 100 kilohertz or more. Typical fluorescent lamp applications operate in a frequency between 20 and 70 kilohertz. The microprocessor output is at pins 6 and 8. Pin 6 is connected directly by line 18 to the drive point B to turn on the bottom transistor in the half bridge. Output Pin 8 is connected by line 53 to high side driver 52 to drive the top transistor at point A via line 17. Since this transistor is not referenced to the common bus, a high side driver must be employed. Power for the high side driver used to drive the transistor is created by charging capacitor 56 through diode 55 when the output of the inverter bridge is low and the bottom transistor is on.

The voltage across the output load is fed back by line 21 and divided by voltage divider resistors 58 and 59 to a voltage that is acceptable to the processor. It is then fed by line 114 to input 7 to allow the microprocessor software to determine the phase angel of the output voltage. By adjusting the frequency to maintain a 90 degree phase shift across the resonant inductor 8 the processor can be sure that the output is always at resonance. The voltage at the junction of resistors 58 and 59 is also rectified by diode 60 and filtered by capacitor 62 and load resistor 61 to input 3 via line 63 to allow the microprocessor to determine the output voltage magnitude. This is very useful when driving the flat panel display of FIG. 3.

The load current is sensed by sensor 32 of FIG. 2 and is fed in via line 22 to capacitor 106 which is part of a voltage doubler consisting of capacitor 106 diode 108 and diode 74. A doubler is used so current sense resistor 32 may be reduced in size by a factor of 2 thus reducing any heat loss the resistor. The doubled voltage is filtered by capacitor 66 and resistor 65 and presented to analog input at Pin 1 via line 67. The voltage representing the heater current is fed on line 73 to doubler consisting of capacitor 105, diode 107 and diode 74 and filtered by capacitor 76 and load resistor and fed by line 77 to the microprocessor. Local control of the output power may be adjusted by potentiometer 70 of FIG. 2, the wiper of which is connected at input 17 via line 28. Resistor 71 in series with potentiometer 70 sets the minimum output level. An analog input voltage from the photocell is presented by line 27 to input at Pin 18.

Remote control is normally a pulse width modulation control system, therefore, it is digital and is presented by line 30 to digital input at Pin 12. If a power line carrier signal is sent, it is sensed on lines 25 and 26 at inputs 10 and 11 which look for changes on the power line signal at the zero crossing point. Two inputs are used to look for each half cycle of the power line. Resistors 110 and 111 act to limit the current flowing into and out of the microprocessor. The absence of signal on these two lines also tells the microprocessor to switch the ballast to the emergency lighting mode of operation. The DC bus voltage on line 93 is divided by resistors 112 and 113 to a voltage range acceptable to the microprocessor so that is may monitor this bus voltage and shut the ballast off if the DC voltage drops to a point where a battery supplying it could be damaged.

Although the present invention has been described in connection with preferred embodiments thereof, many variations and modifications will now become apparent to those skilled in the art. It is preferred, therefore, that the present invention be limited, not by the specific disclosure herein, but only by the appended claims.

What is claimed is:

1. A gas discharge lighting system for regular and emergency lighting comprising:

a gas discharge lighting device;

a source of alternating current input power;

an electronic ballasting circuit having a direct current requirement and coupled between said gas discharge lighting device and said source of input power comprising:

an alternating current-to-direct current conversion means;

a power regulator connected to said conversion means for converting the output of said alternating current to direct current conversion means to a regulated direct current required to operate said ballasting circuit;

a controllable output direct current to alternating current inverter that operates with a substantially square wave output at a frequency above that of audible sound;

an impedance network interposed between said inverter and said gas discharge lighting device to modify said substantially square wave output of said inverter to provide a proper operation of said gas discharge lighting device;

a controlling device that controls the operation of said inverter and thus, via said impedance network, an amount of power delivered to said gas discharge lighting device;

a connection between said source of alternating current input power and said controlling device to allow said controlling device to monitor a presence or an absence of said alternating current input power; and an external source of direct current input power coupled by an unidirectional current flow device to an input of said power regulator.

2. The gas discharge lighting system for regular and emergency lighting as set forth in claim 1 wherein said controlling device is a microprocessor coupled to said gas discharge device to monitor an operation of the gas discharge device and interconnected with said controllable, output direct current to alternating current inverter.

3. The gas discharge lighting system for regular and emergency lighting as set forth in claim 2 wherein said controlling device is programmed to reduce a power drawn from said source of direct current power by lowering the power delivered to said gas discharge lighting device upon the detection of the absence of power from said source of alternating current power.

4. The gas discharge lighting system for regular and emergency lighting as set forth in claim 1 wherein said source of direct current power is or includes a battery.

5. The gas discharge lighting system for regular and emergency lighting as set forth in claim 4 further comprising a charging circuit to output direct current power to said source of direct current power to effect charging of batteries connected to said source of direct current power when said source of alternating power is operational.

6. The gas discharge lighting system for regular and emergency lighting as set forth in claim 5 wherein a voltage level of said source of direct current power is connected to said controlling device with a program included in said controlling device to shut down the ballast upon detecting a voltage indication that said battery has reached a level the further discharge may cause damage.

* * * * *